(12) United States Patent
Coakley et al.

(10) Patent No.: US 11,623,549 B2
(45) Date of Patent: Apr. 11, 2023

(54) INFANT CARRIER

(71) Applicant: Dorel Juvenile Group, Inc., Foxboro, MA (US)

(72) Inventors: Devin J. Coakley, Bellingham, MA (US); Nathan W. Heisey, Seymour, IN (US); Jason H. Johnson, Brownstown, IN (US)

(73) Assignee: Dorel Juvenile Group, Inc., Foxboro, MA (US)

(*) Notice: Subject to any disclaimer, the term of this patent is extended or adjusted under 35 U.S.C. 154(b) by 349 days.

(21) Appl. No.: 16/937,736

(22) Filed: Jul. 24, 2020

(65) Prior Publication Data
US 2021/0022524 A1    Jan. 28, 2021

Related U.S. Application Data (60) Provisional application No. 62/937,845, filed on Nov. 20, 2019, provisional application No. 62/904,105, filed on Sep. 23, 2019, provisional application No. 62/878,429, filed on Jul. 25, 2019.

(51) Int. Cl.
*B60N 2/28* (2006.01)
*A47D 13/02* (2006.01)

(52) U.S. Cl.
CPC .......... *B60N 2/2845* (2013.01); *A47D 13/02* (2013.01); *A47D 13/025* (2013.01); *B60N 2/2806* (2013.01); *B60N 2/2821* (2013.01); *B60N 2/2872* (2013.01)

(58) Field of Classification Search
CPC .. B60N 2/2809; B60N 2/2818; B60N 2/2806; B60N 2/2845; B60N 2/2821; B60N 2/2872; A47D 13/025; A47D 13/02
See application file for complete search history.

(56) References Cited

U.S. PATENT DOCUMENTS

| | | |
|---|---|---|
| 3,596,986 A | 8/1971 | Ragsdale |
| 5,806,924 A | 9/1998 | Gonas |
| 5,893,606 A | 4/1999 | Chiang |
| 6,017,088 A | 1/2000 | Stephens |
| 6,199,949 B1 | 3/2001 | Dasilva |
| 6,375,260 B1 | 4/2002 | Hiramatsu |
| 6,386,632 B1 | 5/2002 | Goor |
| 6,517,153 B1 | 2/2003 | Brewer |
| 6,715,828 B1 | 4/2004 | Cheng |

(Continued)

FOREIGN PATENT DOCUMENTS

| | | |
|---|---|---|
| DE | 102004049919 A1 | 4/2006 |
| EP | 1175858 A2 | 1/2002 |

(Continued)

OTHER PUBLICATIONS

Netherlands Search Report for Netherlands App. No. NL2023469 dated Mar. 3, 2020, DN-139 NL, 7 pages.

(Continued)

*Primary Examiner* — Corey N Skurdal
(74) *Attorney, Agent, or Firm* — Barnes & Thornburg LLP (57) ABSTRACT

An infant carrier is included in a child restraint that may also include a carrier-mount base adapted to be anchored to a passenger seat in a vehicle. The infant carrier includes a shell for holding an infant and a carry handle coupled to the shell and adapted to be gripped by a caregiver.

20 Claims, 5 Drawing Sheets

(56) References Cited

U.S. PATENT DOCUMENTS

| | | |
|---|---|---|
| 6,910,696 B2 | 6/2005 | Bargery |
| 6,913,313 B2 | 7/2005 | Sedlack |
| 7,488,034 B2 * | 2/2009 | Ohren ................ B60N 2/2887 |
| | | 297/256.16 |
| 7,597,396 B2 | 10/2009 | Longenecker |
| 8,070,228 B2 | 12/2011 | Karremans |
| 8,186,757 B2 | 5/2012 | Duncan |
| 8,702,169 B2 | 4/2014 | Abadilla |
| 8,714,639 B2 | 5/2014 | Heisey |
| 8,911,015 B2 | 12/2014 | Cohen |
| 8,998,312 B2 | 4/2015 | Sellers |
| 9,056,567 B2 | 6/2015 | Wuerstl |
| 9,066,610 B2 | 6/2015 | Duan |
| 9,119,483 B1 | 9/2015 | Heisey |
| 9,597,986 B2 | 3/2017 | Hou |
| 9,771,006 B2 | 9/2017 | Forbes |
| 9,771,007 B2 | 9/2017 | Shellenberger |
| 10,028,592 B1 | 7/2018 | Ruiz |
| 10,220,734 B2 | 3/2019 | Cohen |
| 10,363,842 B2 | 7/2019 | Anderson |
| 10,377,274 B2 * | 8/2019 | Anderson ............ B60N 2/2884 |
| 11,034,266 B2 | 6/2021 | Heisey |
| 11,134,793 B2 | 10/2021 | Smith |
| 2009/0295128 A1 * | 12/2009 | Nagelski ................ B62B 9/24 |
| | | 280/642 |
| 2010/0225150 A1 | 9/2010 | Duncan |
| 2010/0230933 A1 | 9/2010 | Dean |
| 2010/0231019 A1 | 9/2010 | Berkey |
| 2014/0084649 A1 * | 3/2014 | Guo ................ B60N 2/2866 |
| | | 297/250.1 |
| 2014/0265255 A1 * | 9/2014 | Wang ................ B60N 2/2806 |
| | | 280/643 |
| 2014/0292049 A1 | 10/2014 | St Pierre |
| 2015/0266399 A1 | 9/2015 | Lake |
| 2016/0031343 A1 | 2/2016 | Juchniewicz |
| 2017/0065098 A1 | 3/2017 | Taylor |
| 2018/0056823 A1 * | 3/2018 | Anderson ............ B60N 2/2845 |
| 2018/0186254 A1 | 7/2018 | Chen |
| 2018/0334059 A1 | 11/2018 | Churilla |
| 2020/0260884 A1 | 8/2020 | Smith |
| 2020/0269733 A1 | 8/2020 | Heisey |
| 2020/0307423 A1 | 10/2020 | Abro |
| 2021/0023969 A1 | 1/2021 | Coakley |

FOREIGN PATENT DOCUMENTS

| | | |
|---|---|---|
| EP | 1259396 A1 | 11/2002 |
| EP | 1591306 A2 | 11/2005 |
| EP | 1591307 A2 | 11/2005 |
| EP | 1837230 B1 | 9/2007 |
| EP | 1969974 B1 | 9/2008 |
| EP | 1974988 B1 | 10/2008 |
| EP | 2108566 B1 | 10/2009 |
| EP | 2210768 B1 | 7/2010 |
| GB | 2429401 A | 2/2007 |
| WO | 199707716 A1 | 3/1997 |
| WO | 200164471 A1 | 9/2001 |
| WO | 2006094341 A1 | 9/2006 |
| WO | 2017029273 A1 | 2/2017 |

OTHER PUBLICATIONS

Netherlands Search Report for Netherlands App. No. NL2023470 dated Mar. 4, 2020, DN-139 NL, 7 pages.

Office Action (Non-Final Rejection) dated Feb. 11, 2022 for U.S. Appl. No. 16/922,302, DN-139 US-U II , (pp. 1-10).

Office Action (Non-Final Rejection) dated Jun. 7, 2022 for U.S. Appl. No. 16/937,885, CO-1255B US-U II (pp. 1-13).

Office Action dated Sep. 15, 2021 for U.S. Appl. No. 16/922,407 (pp. 1-9).

Office Action dated Sep. 15, 2021 for U.S. Appl. No. 16/938,196 (pp. 1-14).

Office Action dated Nov. 4, 2021 for U.S. Appl. No. 16/922,302, (pp. 1-12).

Office Action dated Jun. 9, 2021 for U.S. Appl. No. 16/938,196 (pp. 1-11).

* cited by examiner

INFANT CARRIER

PRIORITY CLAIM

This application claims priority under 35 U.S.C. § 119(e) to U.S. Provisional Application Ser. No. 62/878,429, filed Jul. 25, 2019, U.S. Provisional Application Ser. No. 62/904,105, filed Sep. 23, 2019, U.S. Provisional Application No. 62/937,845, filed Nov. 20, 2019, each of which is expressly incorporated by reference herein.

BACKGROUND

The present disclosure relates to child restraints, and particularly to child restraints that are used to restrain infant children. More particularly, the present disclosure relates to infant carriers that may be mounted on a base in a vehicle and that can be separated from the base and used by a caregiver to carry the infant away from the vehicle.

SUMMARY

A child restraint in accordance with the present disclosure includes an infant carrier. In illustrative embodiments, the infant carrier includes a carrier shell that can be mounted on a stationary carrier-mount base that is anchored to a passenger seat in a vehicle to restrain an infant seated in the infant carrier during transport in the vehicle. The carrier shell of the infant carrier also can be separated from the carrier-mount base to allow a caregiver to transport the infant seated in the carrier shell away from the vehicle using a carry handle included in the infant carrier and coupled to the carrier shell.

In illustrative embodiments, the carrier shell includes a pair of belt receivers and a separate shell body that provides a space for supporting an infant and supports the belt receivers. A carry handle is mounted to the shell body for pivotable movement about a handle-pivot axis between extended and retracted positions. The belt receivers are mounted to respective lateral sides of the shell body to locate the infant-supporting space therebetween.

In illustrative embodiments, each belt receiver is formed to include a belt-path slot that is sized to receive a vehicle seat belt therein through an inlet in the belt receiver that opens into the belt-path slot so that the child restraint is secured to a passenger seat in a vehicle. Each belt-path slot is oriented to extend along an inclined slope when the companion belt receiver is mounted on the shell body.

In illustrative embodiments, the shell body of the carrier shell is formed to include contoured regions on each lateral side. Each belt receiver is mounted to a companion belt-receiver mount included in one of the lateral sides of the shell body to define at least a portion of one of the contoured regions.

In illustrative embodiments, the shell body includes a basin and an endless perimeter rim mounted on an upper edge of the basin. The endless perimeter rim is formed to include the contoured regions that include the belt-receiver mounts that mate with the first and second belt receivers. The basin and the endless perimeter rim cooperate to form the infant-supporting space.

In illustrative embodiments, the first belt-receiver mount includes a negatively sloping inclined first floor section having a high-elevation end arranged to lie in spaced-apart relation to the handle-pivot axis and a relatively lower low-elevation end arranged to lie between the high-elevation end and the handle-pivot axis. The first belt-receiver mount further includes a positively sloping inclined second floor section arranged to extend from the low-elevation end of the first floor section in a direction toward the handle-pivot axis. The first belt-receiver mount further includes an upwardly opening first post receiver coupled to the inclined first floor section, an upwardly opening second post receiver coupled to the inclined second floor section, and an upwardly opening alignment-guide receiver located between the first and second post receivers.

In illustrative embodiments, the first belt receiver includes a downwardly extending first anchor post, a downwardly extending second anchor post, and a downwardly extending belt-receiver alignment guide arranged to lie between the first and second anchor posts. The belt-receiver alignment guide is configured and arranged to extend into the alignment-guide receiver formed in the inclined first floor section of the first belt-receiver mount only when the first belt receiver is aligned properly to mate with the underlying first belt-receiver mount.

The first anchor post extends into the first post receiver and the second anchor post extends into the second post receiver when the first belt receiver occupies a stationary mounted position on the companion first belt-receiver mount. In illustrative embodiments, the infant carrier further includes a first fastener that extends through an aperture formed in the first post receiver and into a passageway formed in first anchor post to retain the first anchor post in the first post receiver so that the first belt receiver remains in the stationary mounted position on the companion first belt-receiver mount.

In illustrative embodiments, each belt receiver includes a base that is arranged to mate with a foundation included in the companion belt-receiver mount. Each belt receiver further includes a strip holder that is coupled to an end of the base that is adjacent to the high-elevation end of the negatively sloping inclined floor of the first belt-receiver mount and a strip that is cantilevered to the strip holder and arranged to lie above and in spaced-apart relation to the base to form the belt-path slot of the first belt receiver therebetween.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed disclosure particularly refers to the accompanying figures in which:

FIG. 8 is a sectional view taken along line 8-8 of FIG. 2 showing that (1) the first belt receiver includes a base coupled to the first belt-receiver mount and a cantilevered strip that lies above a negatively sloping first section of the base and a positively sloping second section of the base to define a hockey-stick-shaped belt-path slot therebetween, (2) first and second anchor posts included in the first belt receiver extend downwardly into companion first and second post receivers formed in the first belt-receiver mount while a blade-shaped belt-receiver alignment guide included in the first belt receiver extends downwardly into an alignment-guide receiver located between the first and second post receivers, and (3) a first fastener is used to retain the first anchor post in the first post receiver and a second fastener is used to retain the second anchor post in the second post receiver so that the first belt receiver is retained in a stationary position on the underlying first belt-receiver mount.

DETAILED DESCRIPTION

Figure 1:
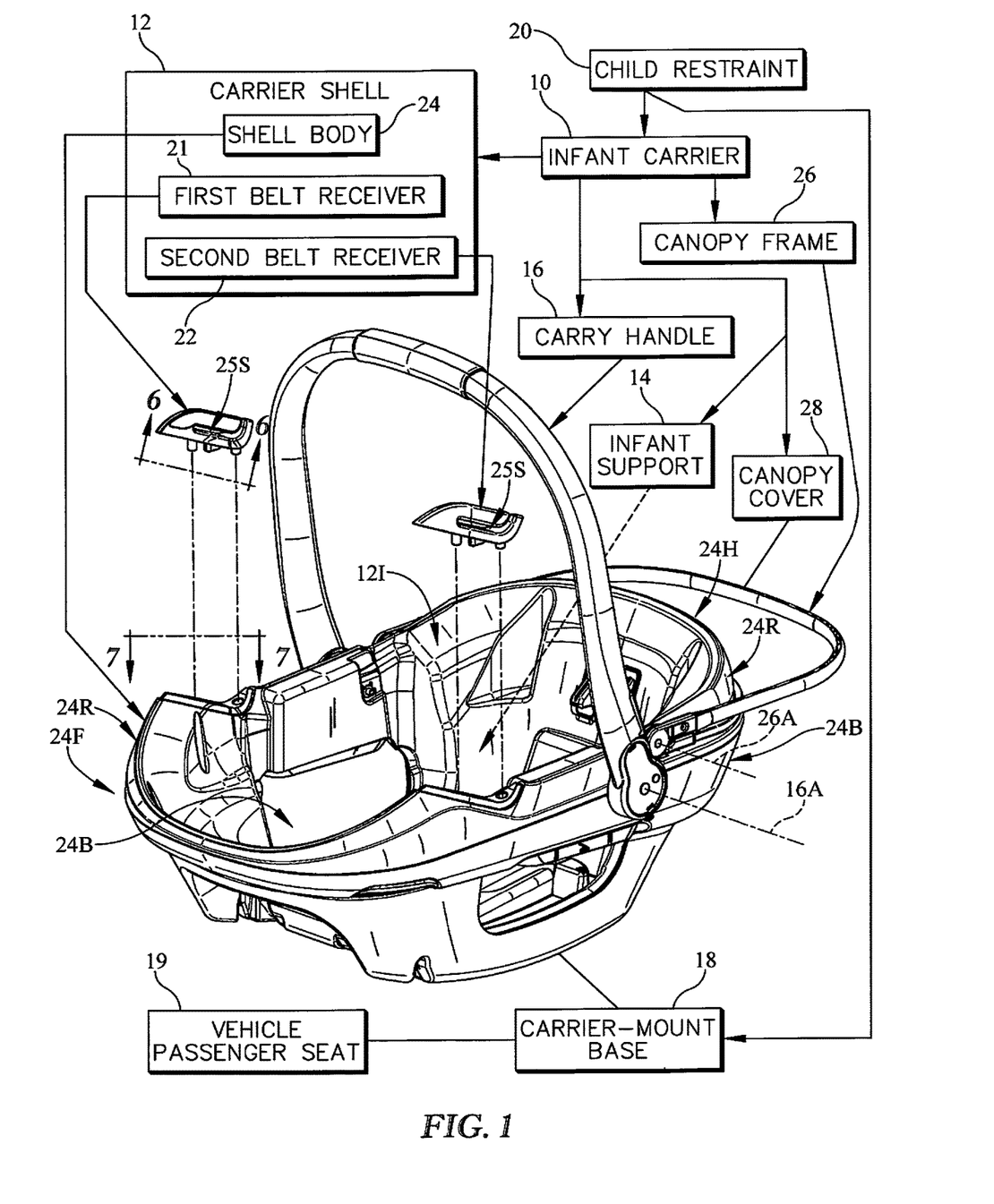
FIG. 1 is an illustration of a child restraint comprising of an illustrative infant carrier in accordance with the present disclosure and a diagrammatic (optional) carrier-mount base and showing that the infant carrier includes a carrier shell comprising a shell body and first and second (vehicle lap) belt receivers separated from underlying belt-receiver mounts formed in the shell body, an infant support shown diagrammatically and adapted to fit in a basin provided in the shell body, a pivotable carry handle, a pivotable canopy frame, and a canopy cover shown diagrammatically and adapted to mount on the canopy frame.

An infant carrier 10 includes a carrier shell 12, an infant support 14 configured to fit in an interior region 121 of carrier shell 12 to hold an infant (not shown) placed in carrier shell 12, and a carry handle 16 mounted on carrier shell 12 for pivotable movement about a handle-pivot axis 16A as shown in FIG. 1. Infant carrier 10 can be mounted by a caregiver in any suitable manner on a carrier-mount base 18 that is anchored in a stationary position on a vehicle passenger seat 19 to provide a child restraint 20 as suggested diagrammatically in FIG. 1. Alternatively, infant carrier 10 can be retained on a passenger seat 19 in a vehicle 19V using a vehicle lap belt 25 passing through first and second belt receivers 21, 22 included in carrier shell 12 in accordance with the present disclosure as suggested in FIG. 2 without using carrier-mount base 18. Infant carrier 10 can be separated from carrier-mount base 18 or otherwise decoupled from vehicle lap belt 25 so that the caregiver can use carry handle 16 to transport an infant restrained on infant support 14 in carrier shell 12 away from a passenger seat 19 in a vehicle 19V.

Figure 2:
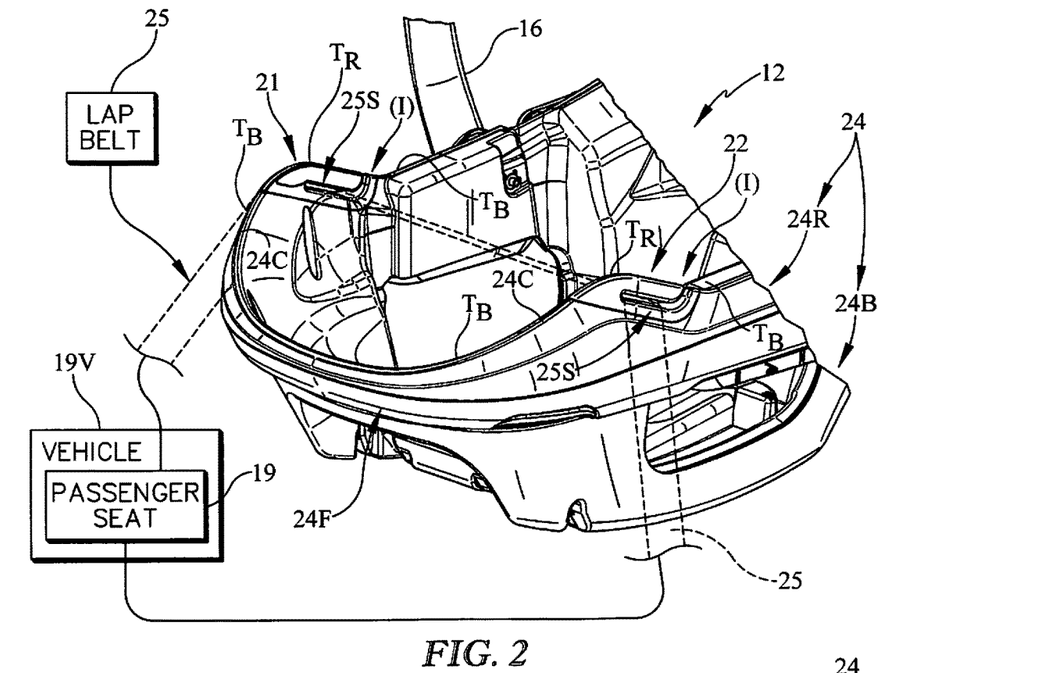
FIG. 2 is a perspective view of a foot-end portion of the infant carrier of FIG. 1 showing that first and second belt receivers have been coupled to companion upwardly facing first and second receiver mounts formed in an upstanding perimeter rim included in the shell body of the carrier shell and suggesting (in phantom) that a vehicle lap belt anchored to a passenger seat in a vehicle passes through an inclined belt-path slot formed in each of the first and second belt receivers to hold the infant carrier in place on a vehicle seat when a carrier-mount base is not being used to hold the infant carrier in a stationary position on the passenger seat.

First and second belt receivers 21, 22 are inset into cut-outs formed in a shell body 24 and mated with shell body 24 to form carrier shell 12 as suggested in FIGS. 1 and 2. Each belt receiver 21, 22 is formed to include a belt-path slot 25S communicating with a companion slot inlet (I) for receiving a portion of a vehicle lap belt 25 shown in phantom in FIG. 2 so that lap belt 25 anchors infant carrier 10 to vehicle passenger seat 19 when infant carrier 10 is desired to be restrained on vehicle passenger seat 19 without using carrier-mount base 18.

Figure 3:
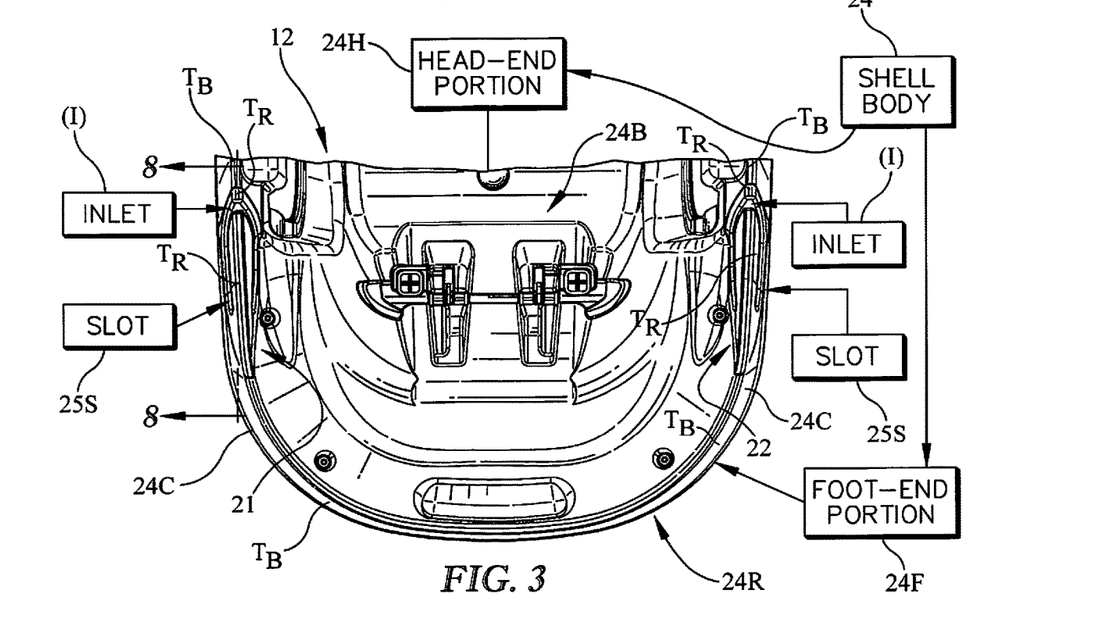
FIG. 3 is a top plan view of the foot-end portion of the infant carrier illustrated in FIG. 2 and showing placement of the first and second belt receivers in opposed relation to one another to cause inlets opening into each of the belt-path slots formed in the first and second belt receivers to face toward a head-end portion of the shell body.
Figure 4:
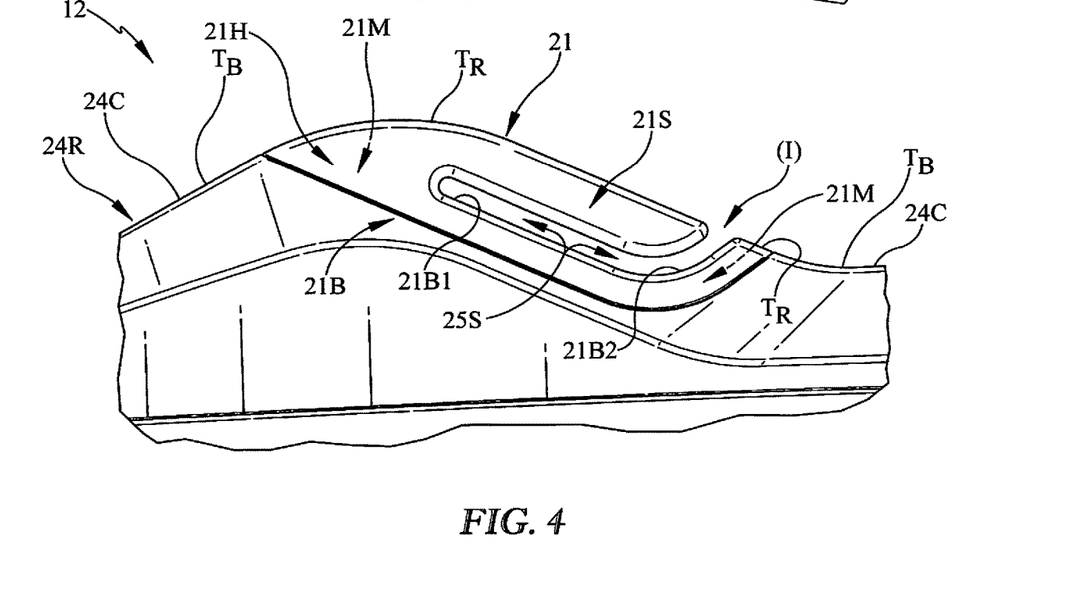
FIG. 4 is a right-side elevation view of the foot-end portion of the carrier shell showing a negatively sloping orientation of the first belt receiver when coupled to the underlying first belt-receiver mount included in the shell body of the infant carrier.

Each of first and second belt receivers 21, 22 is positioned to lie in an inclined orientation when mounted on shell body 24 as suggested in FIG. 2 to cause a high-elevation end HE of each belt receiver 21, 22 to face toward a foot end 24F of shell body 24 and an opposite low-elevation end LE of each belt receiver 21, 22 to face toward an opposite head end 24H of shell body 24 so that an inlet (I) opening into belt-path slot 25S faces rearwardly toward head end 24H of shell body 24 and upwardly away from shell body 24. Each of first and second belt receivers 21, 22 includes a top surface $T_R$ that faces upwardly and has a shape that is contoured to match and complement an adjacent contoured top surface $T_B$ of shell body 24 as suggested in FIGS. 2-4. A portion of each top surface $T_R$ near low-elevation end LE is interrupted by the inlet (I) opening into belt-path slot 25S as suggested in FIGS. 3 and 4.

Shell body 24 is formed to include a first belt-receiver mount 21M on one side of an infant-receiving space 121 provided in shell body 24 and a laterally opposite second belt-receiver mount 22M on another side of the infant-receiving space 121 as suggested in FIG. 1. During assembly of infant carrier 10, first belt receiver 21 is moved downwardly as suggested in FIG. 1 to mate with the upwardly facing first belt-receiver mount 21M as suggested in FIGS. 2 and 5. Likewise, second belt receiver 22 is mated with second belt-receiver mount 22M as suggested in FIGS. 1 and 2. Once mounted on shell body 24, first and second belt receivers 21, 22 are oriented to receive portions of vehicle lap belt 25 as suggested in FIG. 2 so that infant carrier 10 is retained in a substantially stationary position on vehicle passenger seat 19 without the use of carrier-mount base 18.

Shell body 24 includes a basin 24B and a rim 24R that is mounted on an upper edge of basin 24B as suggested in FIG. 1. Rim 24R is endless and extends in an uninterrupted manner along the endless upper edge of basin 24B in an illustrative embodiment shown in FIG. 1. Basin 24B and rim 24R cooperate to form an infant-receiving space 121 sized to receive portions of infant support 14 deposited into basin 24B and an infant placed on infant support 14.

Rim 24R of shell body 24 is formed to include contoured segments 24C on each lateral side of rim 24R near the foot end 24F of shell body 24 as shown, for example, in FIG. 1. Each contoured segment 24C of rim 24R includes either a first foundation 21F of first belt-receiver mount 21M hat is configured to mate with and support first belt receiver 21 as suggested in FIGS. 1-5 and 7 or a second foundation 22F of second belt-receiver mount 22M that is configured to mate with and support second belt receiver 22 as suggested in FIGS. 1-3. Foundations 21F and 22F are mirror images of one another in an illustrative embodiment of the present disclosure.

Figure 7:
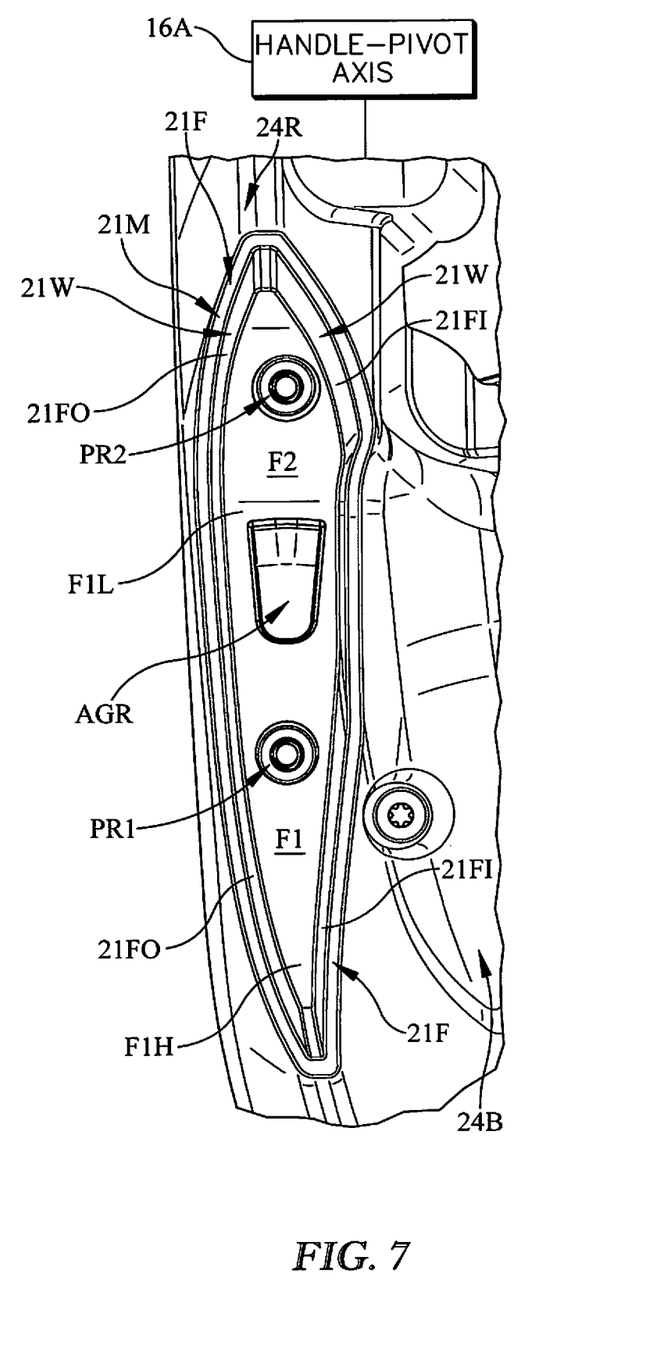
FIG. 7 is a top plan view of the first receiver mount.
Figure 8:
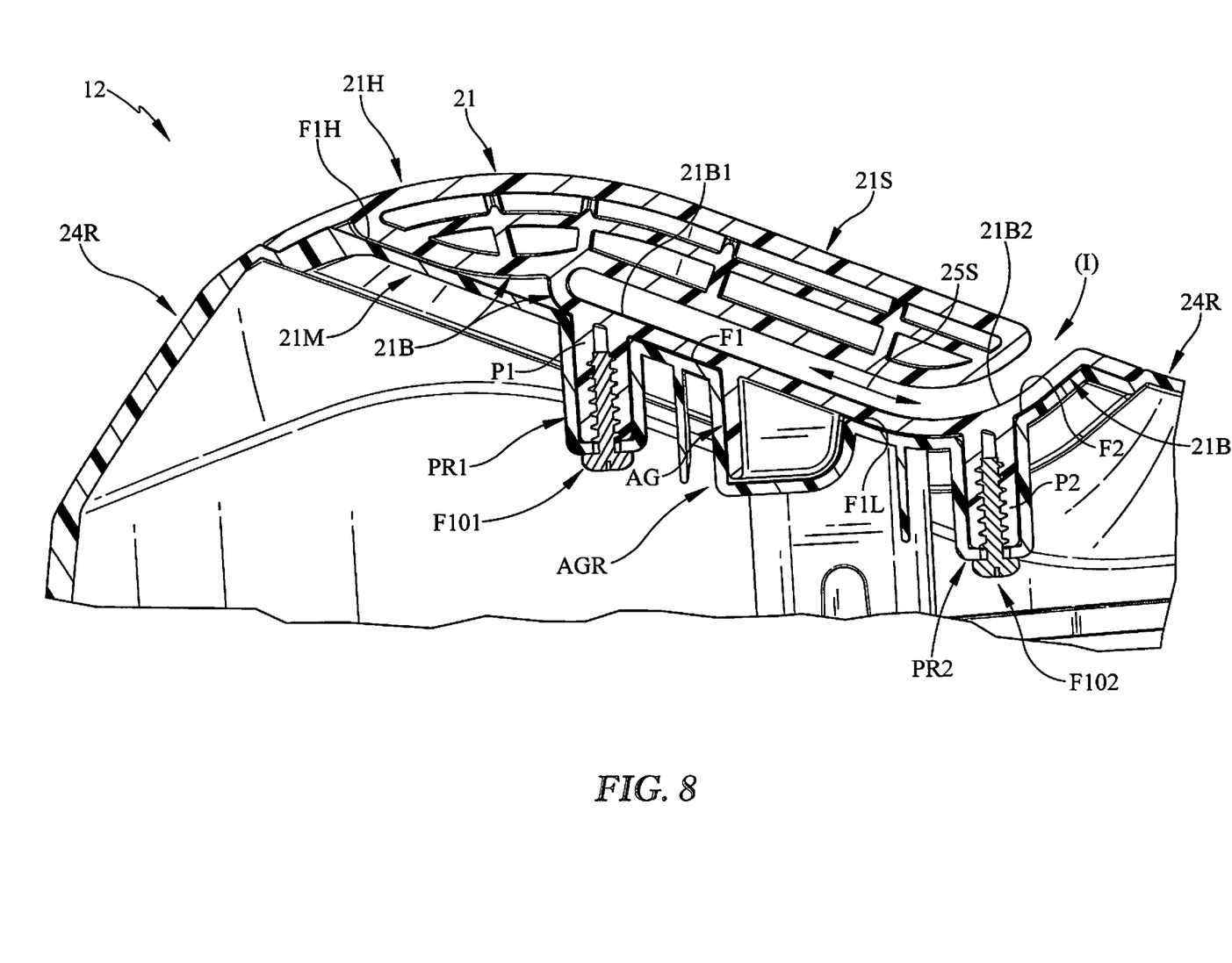

First belt-receiver mount 21M includes a negatively sloping inclined first floor section F1 having a high-elevation end F1H arranged to lie in spaced-apart relation to handle-pivot axis 16A and a relatively lower low-elevation end F1L arranged to lie between the high-elevation end F1H and handle-pivot axis 16A as suggested in FIGS. 7 and 8. First belt-receiver mount 21M further includes a positively sloping inclined second floor section F2 arranged to extend from the low-elevation end F1L of the first floor section F1 in a direction toward handle-pivot axis 16A. First belt-receiver mount 21M further includes an upwardly opening first post receiver PR1 coupled to the inclined first floor section F1, an upwardly opening second post receiver PR2 coupled to the inclined second floor section F2, and an upwardly opening alignment-guide receiver AGR located between the first and second post receivers as suggested in FIGS. 5, 7, and 8.

First foundation 21F of first belt-receiver mount 21M extends along the entire perimeter of inclined first and second floor sections F1, F2 and lies below floor sections F1, F2 to provide a frame around floor sections F1, F2 as shown, for example, in FIG. 7. A raised side wall 21W is arranged to extend upwardly from an interior edge of first foundation 21F to an exterior edge of first and second floor sections F1, F2 as suggested in FIGS. 5 and 7 to elevate floor sections F1, F2 above first foundation 21F. First foundation 21F surrounds the first and second post receivers PR1, PR2 and the alignment-guide receiver AGR that are coupled to floor sections F1, F2 as suggested in FIGS. 5 and 7.

First foundation 21F of first belt-receiver mount 21M includes an outer segment 21FO that extends along outer edges of floor sections F1, F2 as suggested in FIG. 7. First foundation 21F also includes an inner segment 21FI that extends along inner edges of floor sections F1, F2 and interconnects opposite ends of outer segment 21FO as shown in FIG. 7. First belt receiver 21 engages upwardly facing surfaces of outer and inner segments 21FO, 21FI when first belt receiver 21 mates with an underlying first foundation 21F of first belt-receiver mount 21M.

Figure 5:
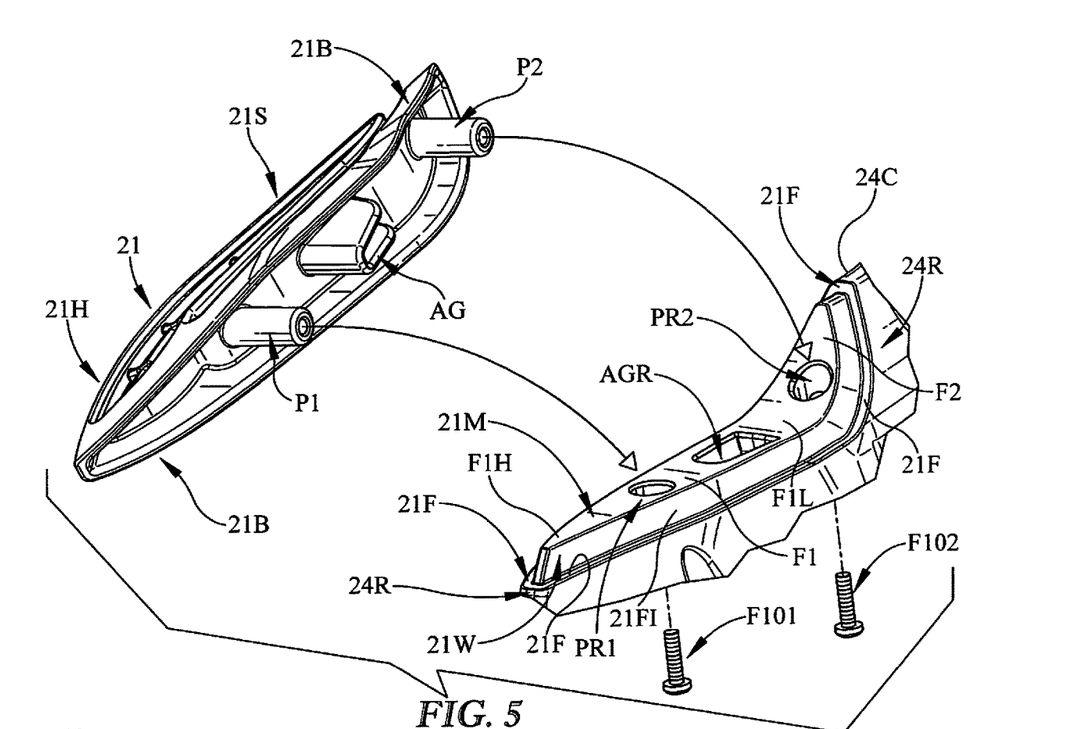
FIG. 5 is an enlarged exploded perspective assembly view showing how features (e.g. a first anchor post, an alignment guide, and a second anchor post) provided on the underside of the first belt receiver align with companion features (e.g. a first post receiver, an alignment-guide receiver, and a second post receiver) provided on the topside of the first receiver mount to facilitate coupling of the first belt receiver to the companion first belt-receiver mount and also showing the two fasteners that are used to retain the first belt receiver in a stationary position on the first belt-receiver mount as shown in FIG. 8.
Figure 6:
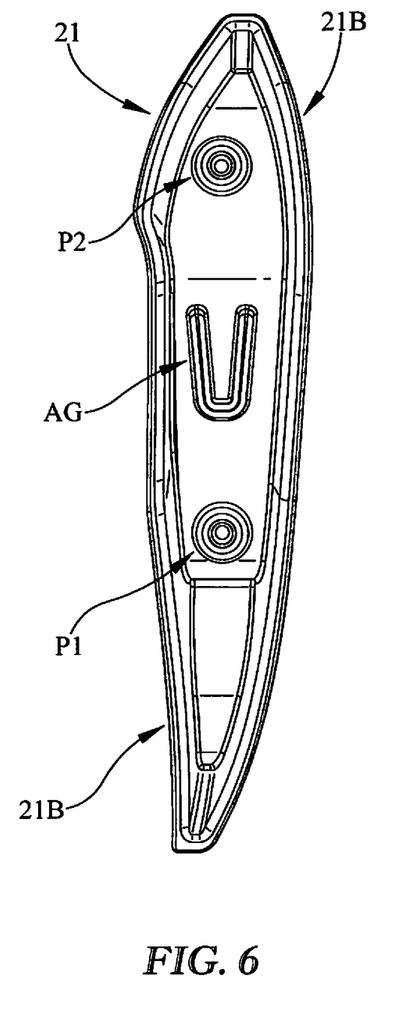
FIG. 6 is a bottom view of the first belt receiver.

First belt receiver 21 includes a downwardly extending first anchor post P1, a downwardly extending second anchor post P2, and a downwardly extending belt-receiver alignment guide AG formed to include an asymmetric perimeter edge and arranged to lie between first and second anchor posts P1, P2 as suggested in FIGS. 5 and 6. Each of the first and second anchor posts P1, P2 is cylindrical as shown in FIG. 5. Alignment guide AG has a U-shaped end profile and is asymmetric as suggested in FIGS. 5 and 6. Belt-receiver alignment guide AS is configured and arranged to extend into alignment-guide receiver AGR formed in the inclined first floor section F1 of first belt-receiver mount 21M only when first belt receiver 21 is aligned properly to mate with first foundation 21F of the underlying first belt-receiver mount 21M to cause first anchor post P1 to extend into first post receiver PR1 and second anchor post P2 to extend into second post receiver PR2.

First anchor post P1 extends into first post receiver PR1 and second anchor post P2 extends into second post receiver PR2 when first belt receiver 21 occupies a stationary mounted position on first foundation 21F of the companion first belt-receiver mount 21M as suggested in FIG. 8. In illustrative embodiments, infant carrier 10 further includes a first fastener F101 that extends through an aperture formed in first post receiver PR1 and into a passageway formed in first anchor post P1 to retain first anchor post P1 in first post receiver PR1 so that first belt receiver 21 remains in the stationary mounted position on the companion first belt-receiver mount 21M.

First belt receiver 21 includes a base 21B that is arranged to mate with first foundation 21F included in first belt-receiver mount 21M as suggested in FIG. 5. First belt receiver 21 further includes a strip holder 21H that is coupled to an end of the base 21B that is adjacent to the high-elevation end F1H of the negatively sloping inclined first floor section F1 of first foundation 21F of first belt-receiver mount 21M and a strip 21S that is cantilevered to strip holder 21H and arranged to lie above and in spaced-apart relation to base 21B to form the belt-path slot 25S of first belt receiver 21 therebetween. Cantilevered strip 21S lies above a negatively sloping first section 21B1 of base 21B and a positively sloping second section 21B2 of base 21B to define a hockey-stick-shaped belt-path slot 25S therebetween as suggested in FIGS. 4 and 8. In some embodiments, the hockey-stick-shaped belt-path slot 25S has a first portion that extends in a first direction and a second portion that extends in a second direction to define an obtuse angle between the first portion and the second portion. The first and second portions may have rounded portions therebetween.

In illustrative embodiments, the belt receivers 21, 22 are separable from the shell body 24 and made from a material with a higher rigidity than shell body 24. Each belt receiver 21, 22 includes a pair of attachment posts P1, P2 that are each formed to include a space configured to receive a fastener F101, F102 therein to mount each belt receiver 21, 22 to shell body 24. Shell body 24 is formed to include a pair of post-receiving spaces PR1, PR2 configured to mate with attachment posts P1, P2 formed on each corresponding belt receiver 21, 22.

In illustrative embodiments, each belt receiver 21, 22 further includes a U-shaped belt-receiver alignment guide AG formed on the belt receiver 21, 22 between the attachment posts P1, P2. The U-shaped belt-receiver alignment guide AG is configured to guide each belt receiver 21, 22 into place on the shell body 24 prior to securing the belt receivers 21, 22 to the shell body 24 with the fasteners F101, F102. Shell body 24 is further formed to include corresponding belt-receiver guide slots AGR formed between each post-receiving space PR1, PR2 and configured to receive each respective U-shaped belt-receiver alignment guide AG when the belt receivers 21, 22 are mounted on shell body 24.

In illustrative embodiments, infant carrier 10 also includes a canopy frame 26 that is pivotably coupled to shell body 24 as suggested in FIG. 1. Any suitable canopy cover 28 is coupled to canopy frame to open and close in response to pivotable movement of canopy frame about a frame-pivot axis 26A.

The invention claimed is:
1. An infant carrier comprising
a carrier shell including a shell body formed to provide an infant-receiving space for supporting an infant and belt-receiver means for attaching to the shell body and providing a belt-path slot on each lateral side of the shell body that is sized to receive therein a vehicle seat belt that extends laterally over the infant-receiving space to secure the shell body to an underlying carrier-mount base or vehicle passenger seat and
a carry handle mounted to the shell body for pivotable movement about a handle-pivot axis between extended and retracted positions,
wherein the belt-receiver means includes a first belt receiver mounted in a first belt-receiver mount formed on a first lateral side of the shell body to lie in a non-horizontal inclined orientation and a second belt-receiver mounted in a second belt-receiver mount formed on an opposing second lateral side of the shell body to lie in a non-horizontal inclined orientation and in laterally spaced-apart relation to the first belt receiver to locate the infant-receiving space therebetween, wherein each of the first and second belt receivers is formed to include a belt-path slot adapted to receive a portion of the vehicle seat belt therein and an inlet opening into the belt-path slot, the first belt receiver is mounted to establish an inclined orientation of the belt-path slot of the first belt receiver and to locate the inlet of the first belt receiver between the handle-pivot axis and the belt-path slot of the first belt receiver, and the second belt receiver is mounted in the second belt-receiver mount to establish an inclined orientation of the belt-path slot of the second belt receiver and to locate the inlet of the second belt receiver between the handle-pivot axis and the belt-path slot of the second belt receiver, and wherein the first belt receiver includes a base that is arranged to mate with an inclined foundation included in the first belt-receiver mount, a strip holder that is coupled to one end of the base, and a strip that is cantilevered to the strip holder and arranged to lie above and in spaced-apart relation to the base to form the belt-path slot of the first belt receiver therebetween.

2. The infant carrier of claim 1, wherein the inlet of the first belt receiver is formed in an inclined exterior surface of the first belt receiver and the belt-path slot of the first belt receiver is hockey-stick-shaped.

3. The infant carrier of claim 2, wherein a distal tip of the strip and an opposite end of the base cooperate to form the inlet that opens into the belt-path slot of the first belt receiver.

4. The infant carrier of claim 2, wherein the strip lies above a negatively sloping first section of the base and a positively sloping second section of the base that lies between the inlet and the negatively sloping first section to define the hockey-stick-shaped belt-path slot of the first belt receiver between the strip and the first and second sections of the base.

5. The infant carrier of claim 1, wherein the first belt receiver is positioned to lie in an inclined orientation when mounted on the inclined foundation included in the first-belt receiver mount to cause a high-elevation end of the first belt receiver to face toward a foot end of the shell body and a relatively lower opposite low-elevation end of the first belt receiver to face toward an opposite head end of the shell body so that the inlet faces rearwardly toward the opposite head end of the shell body and upwardly away from the shell body.

6. The infant carrier of claim 5, wherein the first belt receiver includes a top surface that faces upwardly and has a shape that is contoured to match and complement an adjacent contoured top surface of the shell body and a portion of the top surface of the first belt receiver is interrupted near the low-elevation end by the inlet opening into the belt-path slot.

7. The infant carrier of claim 1, wherein the first belt-receiver mount includes a negatively sloping inclined first floor section having a high-elevation end arranged to lie in spaced-apart relation to the handle-pivot axis and a relatively lower low-elevation end arranged to lie between the high-elevation end and the handle-pivot axis, the first belt-receiver mount further includes a positively sloping inclined second floor section arranged to extend from the low-elevation end of the first floor section in a direction toward the handle-pivot axis, an upwardly opening first post receiver coupled to the inclined second floor section, and wherein the first belt receiver includes a downwardly extending first anchor post that extends into the first post receiver when the first belt receiver is mounted on the first belt-receiver mount and a downwardly extending second anchor post that extends into a second post receiver when the first belt receiver is mounted on the first belt-receiver mount.

8. The infant carrier of claim 7, wherein the first belt-receiver mount further includes an upwardly opening alignment-guide receiver located between the first and second post receivers and the first belt receiver includes a downwardly extending belt-receiver alignment guide that extends into the alignment-guide receiver when the first belt receiver is mounted on the first belt-receiver mount.

9. The infant carrier of claim 8, wherein each of the first and second post receivers is round and the alignment guide receiver is non-round.

10. The infant carrier of claim 9, wherein the alignment-guide receiver has an asymmetric perimeter edge and the belt-receiver alignment guide has a companion asymmetric shape that is configured and arranged to extend into the alignment guide receiver only when the first belt receiver is aligned properly to mate with the foundation of the first belt-receiver mount to connect the first anchor post to extend into the first post receiver and the second anchor post to extend into the second post receiver.

11. The infant carrier of claim 7, wherein the foundation of the first belt-receiver mount extends along the perimeter of the inclined first and second floor sections and lies below the first and second floor sections to provide a frame around the first and second floor sections and a raised side wall that is arranged to extend upwardly from an interior edge of the foundation to an exterior edge of the first and second floor sections to elevate the first and second floor sections above the foundation.

12. The infant carrier of claim 11, wherein the foundation of the first belt-receiver mount includes an outer segment that extends along outer edges of the first and second floor sections and an inner segment that extends along inner edges of the first and second floor sections and the first belt receiver engages upwardly facing surfaces of the outer and inner segments when the first belt receiver mates with the foundation of the first belt-receiver mount.

13. The infant carrier of claim 12, wherein the base includes a base side wall that surrounds and faces toward the raised side wall of the first belt-receiver mount, a top wall coupled to top edges of the base side wall, and the first anchor post that depends from an underside of the top wall of the base and extends into the first post receiver formed in the foundation when the first belt receiver is mounted on the first belt-receiver mount.

14. An infant carrier comprising
a carrier shell including a shell body formed to provide an infant-receiving space for supporting an infant and belt-receiver means for attaching to the shell body and providing a belt-path slot on each lateral side of the shell body that is sized to receive therein a vehicle seat belt that extends laterally over the infant-receiving space to secure the shell body to an underlying carrier-mount base or vehicle passenger seat and
a carry handle mounted to the shell body for pivotable movement about a handle-pivot axis between extended and retracted positions,
wherein the belt-receiver means includes a first belt receiver mounted in a first belt-receiver mount formed on a first lateral side of the shell body to lie in a non-horizontal inclined orientation and a second belt-receiver mounted in a second belt-receiver mount formed on an opposing second lateral side of the shell body to lie in a non-horizontal inclined orientation and in laterally spaced-apart relation to the first belt receiver to locate the infant-receiving space therebetween, wherein each of the first and second belt receivers is formed to include a belt-path slot adapted to receive a portion of the vehicle seat belt therein and an inlet opening into the belt-path slot, the first belt receiver is mounted to establish an inclined orientation of the belt-path slot of the first belt receiver and to locate the inlet of the first belt receiver between the handle-pivot axis and the belt-path slot of the first belt receiver, and the second belt receiver is mounted in the second belt-receiver mount to establish an inclined orientation of the belt-path slot of the second belt receiver and to locate the inlet of the second belt receiver between the handle-pivot axis and the belt-path slot of the second belt receiver, and wherein each of the first and second belt receivers are separable from the shell body and made from a material with a higher rigidity than the shell body, each of the first and second belt receivers includes a pair of attachment posts that are each formed to include a space configured to receive a fastener therein to mount each belt receiver to the shell body, the shell body is formed to include a companion pair of post-receiving spaces configured to receive and mate with the attachment posts formed on each corresponding belt receiver, and a fastener to retain each attachment post in a companion post-receiving space.

15. The infant carrier of claim 14, wherein the first belt receiver includes a base coupled to the first belt-receiver mount and a cantilevered strip that lies above a negatively sloping first section of the base and a positively sloping second section of the base to define a hockey-stick shaped belt-path slot therebetween and wherein a blade-shaped belt-receiver alignment guide included in the first belt receiver extends downwardly into an alignment-guide receiver included in the first belt-receiver mount and located between the post-receiving spaces.

16. The infant carrier of claim 14, wherein the first belt receiver includes a base that is arranged to mate with an inclined foundation included in the first belt-receiver mount, a strip holder that is coupled to one end of the base, and a strip that is cantilevered to the strip holder and arranged to lie above and in spaced-apart relation to the base to form the belt-path slot of the first belt receiver therebetween.

17. The infant carrier of claim 16, wherein the first belt receiver is positioned to lie in an inclined orientation when mounted on the inclined foundation included in the first-belt receiver mount to cause a high-elevation end of the first belt receiver to face toward a foot end of the shell body and a relatively lower opposite low-elevation end of the first belt receiver to face toward an opposite head end of the shell body so that the inlet faces rearwardly toward the opposite head end of the shell body and upwardly away from the shell body.

18. An infant carrier comprising
a carrier shell including a shell body formed to provide an infant-receiving space for supporting an infant and belt-receiver means for attaching to the shell body and providing a belt-path slot on each lateral side of the shell body that is sized to receive therein a vehicle seat belt that extends laterally over the infant-receiving space to secure the shell body to an underlying carrier-mount base or vehicle passenger seat and a carry handle mounted to the shell body for pivotable movement about a handle-pivot axis between extended and retracted positions, wherein the belt-receiver means includes a first belt receiver mounted in a first belt-receiver mount formed on a first lateral side of the shell body to lie in a non-horizontal inclined orientation and a second belt-receiver mounted in a second belt-receiver mount formed on an opposing second lateral side of the shell body to lie in a non-horizontal inclined orientation and in laterally spaced-apart relation to the first belt receiver to locate the infant-receiving space therebetween, wherein each of the first and second belt receivers is formed to include a belt-path slot adapted to receive a portion of the vehicle seat belt therein and an inlet opening into the belt-path slot, the first belt receiver is mounted to establish an inclined orientation of the belt-path slot of the first belt receiver and to locate the inlet of the first belt receiver between the handle-pivot axis and the belt-path slot of the first belt receiver, and the second belt receiver is mounted in the second belt-receiver mount to establish an inclined orientation of the belt-path slot of the second belt receiver and to locate the inlet of the second belt receiver between the handle-pivot axis and the belt-path slot of the second belt receiver, and wherein the first belt-receiver mount includes a negatively sloping inclined first floor section having a high-elevation end arranged to lie in spaced-apart relation to the handle-pivot axis and a relatively lower low-elevation and arranged to lie between the high-elevation end of the first floor section in a direction toward the handle-pivot axis and the first belt-receiver mount further includes an upwardly opening first post receiver coupled to the inclined first floor section, an upwardly opening second post receiver coupled to the inclined second floor section and an upwardly opening alignment-guide receiver located between the first and second post receivers.

19. The infant carrier of claim 18, wherein the first belt receiver includes a downwardly extending first anchor post, a downwardly extending second anchor post, and a downwardly extending belt-receiver alignment guide arranged to lie between the first and second anchor posts, the belt-receiver alignment guide is configured and arranged to extend into the alignment-guide receiver formed in the inclined first floor section of the first belt-receiver mount only when the first belt receiver is aligned properly to mate with the underlying first belt-receiver mount, and the first anchor post extends into the first post receiver when the first belt receiver occupies a stationary mounted position in the companion first belt-receiver mount.

20. The infant carrier of claim 19, further comprising a first fastener that extends through an aperture formed in the first post-receiver and into a passageway formed in the first anchor post to retain the first anchor post in the first post receiver so that the first belt receiver remains in the stationary mounted position on the companion first belt-receiver mount.

* * * * *